US008600645B2

(12) United States Patent
Culbertson et al.

(10) Patent No.: US 8,600,645 B2
(45) Date of Patent: Dec. 3, 2013

(54) INDUCTION BACKFIRE COMPENSATION FOR MOTORCYCLES

(75) Inventors: Thomas Raymond Culbertson, Livonia, MI (US); Eric Bender, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 733 days.

(21) Appl. No.: 12/827,156

(22) Filed: Jun. 30, 2010

(65) Prior Publication Data

US 2012/0004823 A1 Jan. 5, 2012

(51) Int. Cl.

| | |
|---|---|
| ***G06F 19/00*** | (2011.01) |
| ***F02D 41/30*** | (2006.01) |
| ***F02D 41/18*** | (2006.01) |

(52) U.S. Cl.
USPC ............................ 701/103; 701/104; 701/110

(58) Field of Classification Search
USPC ......................... 123/478, 480, 486, 492, 493; 701/101–105, 108–110, 114, 115; 702/182, 183
See application file for complete search history.

(56) References Cited

U.S. PATENT DOCUMENTS

| | | | | |
|---|---|---|---|---|
| 4,142,495 | A * | 3/1979 | Lahiff | 123/676 |
| 4,242,728 | A * | 12/1980 | Hartford | 701/108 |
| 4,619,237 | A * | 10/1986 | Auslander et al. | 123/491 |
| 5,769,053 | A * | 6/1998 | Nonaka | 123/406.44 |
| 6,691,023 | B2 * | 2/2004 | Fujino et al. | 701/114 |
| 6,701,906 | B2 * | 3/2004 | Kim | 123/698 |

* cited by examiner

*Primary Examiner* — Willis R Wolfe, Jr.
(74) *Attorney, Agent, or Firm* — Fraser Clemens Martin & Miller LLC; J. Douglas Miller

(57) ABSTRACT

A control system for an engine having at least one manifold, a throttle, and a crank wheel, includes a pressure sensor to measure a pressure in the at least one manifold, a throttle position sensor to measure a position of the throttle of the engine, a revolution sensor to measure a rate of rotation of the crank wheel of the engine, a processor in communication with each of the pressure sensor, the throttle position sensor, and the revolution sensor to receive an input signal, analyze the input signal based upon an instruction set, and generate a control signal in response to analysis of the input signal, wherein the input signal is representative of at least one of the pressure, the throttle position, and the rate of rotation, and an engine system in communication with the processor and responsive to the control signal to control a function thereof.

19 Claims, 4 Drawing Sheets

INDUCTION BACKFIRE COMPENSATION FOR MOTORCYCLES

FIELD OF THE INVENTION

The present invention relates generally to an internal combustion engine. In particular, the invention is directed to an engine control system and a method for induction backfire compensation for the engine.

BACKGROUND OF THE INVENTION

Induction backfires can sometimes occur in engines of motorcycles and the like. As an example, FIG. 1 illustrates a graphical plot 2 of a manifold pressure sensor feedback for a two cylinder engine with a plurality of independent intake manifolds. A manifold absolute pressure (MAP) sensor is disposed in at least one of the manifolds to measure a pressure thereof. A plurality of samples 4 (i.e. readings) of the pressure of the at least one of the manifolds are taken at a plurality of pre-determined intervals. A pulse width 6 of a fuel injection into each of the manifolds is then adjusted based upon the samples 4 of the manifold pressure. Where an induction backfire event 8 occurs, the sample 4 of the pressure measurement during the induction back fire event 8 causes an erroneous increase in a subsequent one of the pulse widths 6' of the fuel injection. The erroneous increase in the pulse width 6' results in over-fueling of a subsequent engine cycle event due to a false high mass-air calculation and a reaction of the x-tau wall wetting transient fuel compensation.

The induction backfire itself can often cause a stall condition in the engine. However, an excessive fueling for an engine cycle maximizes the probability of a stall condition.

Various systems and methods have been developed to minimize the occurrence of an induction backfire event. For example, recalibrating a fuel and an idle control has minimized the occurrences of the induction backfire. However, the induction backfire events have not been eliminated from engine operation.

It would be desirable to develop an engine control system and a method for induction backfire compensation for an engine, wherein the system and the method provide a means of minimizing a stall condition in the engine due to an induction backfire event.

SUMMARY OF THE INVENTION

Concordant and consistent with the present invention an engine control system and a method for induction backfire compensation for an engine, wherein the system and the method provide a means of minimizing a stall condition in the engine due to an induction backfire event, has surprisingly been discovered.

In one embodiment, a control system for an engine having at least one manifold, a throttle, and a crank wheel, the system comprises: a pressure sensor to measure a pressure in the at least one manifold and generate a pressure signal representing the pressure measured; a throttle position sensor to measure a position of the throttle of the engine and generate a throttle signal representing the position of the throttle measured; a revolution sensor to measure a rate of rotation of the crank wheel of the engine and generate a rotation signal representing the rate of rotation measured; a processor in communication with each of the pressure sensor, the throttle position sensor, and the revolution sensor to receive the pressure signal, the throttle signal, and the rotation signal, analyze the pressure signal, the throttle signal, and the rotation signal based upon an instruction set, and generate a control signal in response to analysis of the pressure signal, the throttle signal, and the rotation signal; and an engine system in communication with the processor to receive the control signal therefrom, the engine system responsive to the control signal to control a function of the engine system.

The invention also provides methods for induction backfire compensation.

One method comprises the steps of:

a) providing an engine having at least one manifold, a throttle, and a crank wheel;
b) measuring a pressure in the at least one manifold;
c) measuring a position of the throttle;
d) measuring a rate of rotation of the crank wheel;
e) determining an inferred pressure value based upon the position of the throttle measured and the rate of rotation of the crank wheel measured;
f) comparing a ratio of the pressure measured and the inferred pressure value to a calibratable threshold;
g) selecting one of the pressure measured and the inferred pressure value based upon whether the ratio of the pressure measured and the inferred pressure exceeds the calibratable threshold; and
h) controlling an engine system in response to the one of the pressure measured and the inferred pressure selected.

Another method comprises the steps of:

a) providing an engine having at least one manifold, a throttle, a crank wheel, and a fuel injection device;
b) measuring an absolute pressure in the at least one manifold;
c) measuring a position of the throttle;
d) measuring a rate of rotation of the crank wheel;
e) calculating an inferred pressure based upon the position of the throttle measured and the rate of rotation of the crank wheel measured;
f) comparing a ratio of the pressure measured and the inferred pressure to a calibratable threshold;
g) selecting one of the pressure measured and the inferred pressure based upon whether the ratio of the pressure measured and the inferred pressure exceeds the calibratable threshold; and
h) controlling the fuel injection device in response to the one of the pressure measured and the inferred pressure selected.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
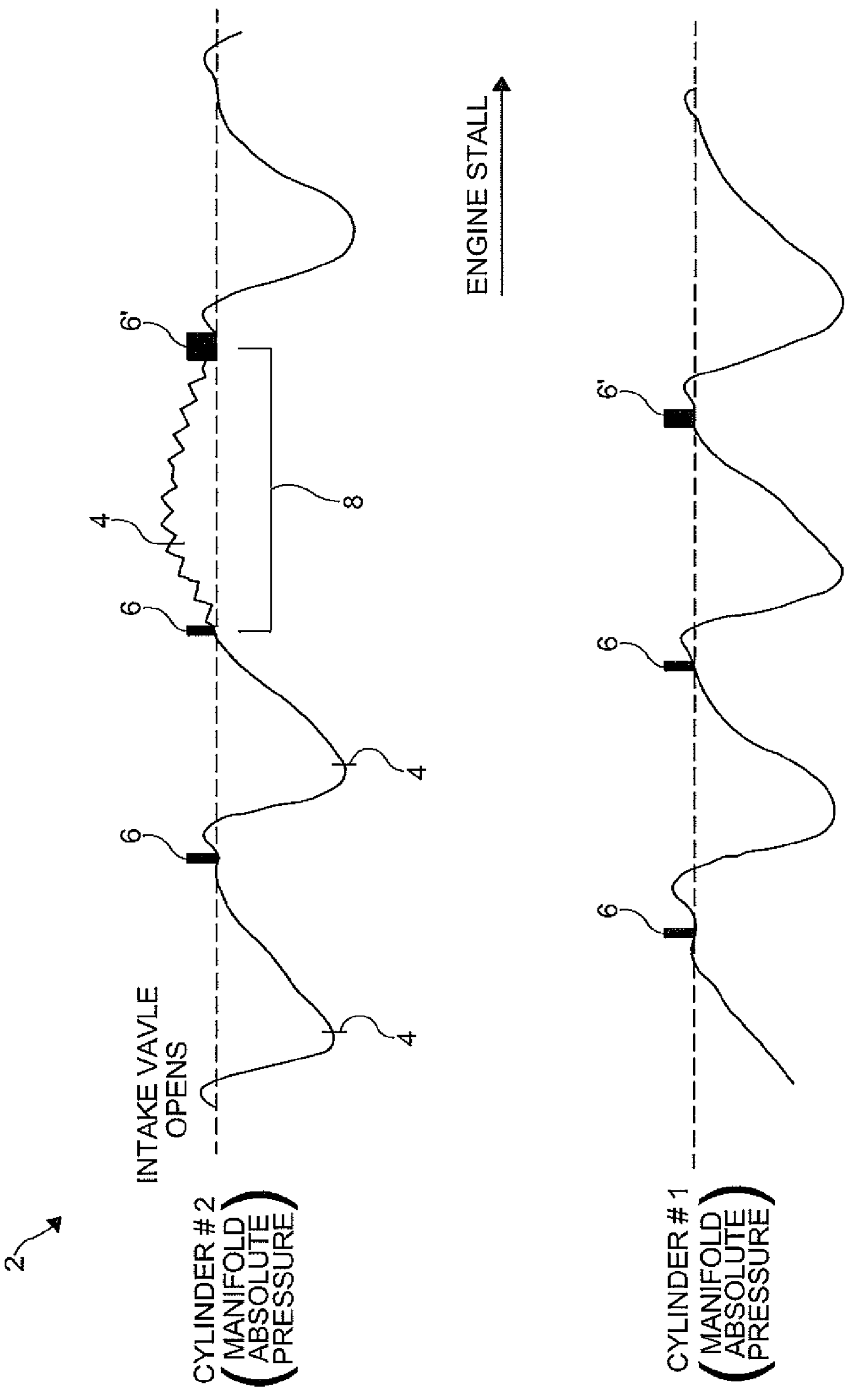
FIG. 1 (PRIOR ART)
FIG. 1 is graphical representation of a manifold pressure sensor feedback for a two cylinder engine with independent intake manifolds according to the prior art.
Figure 2:
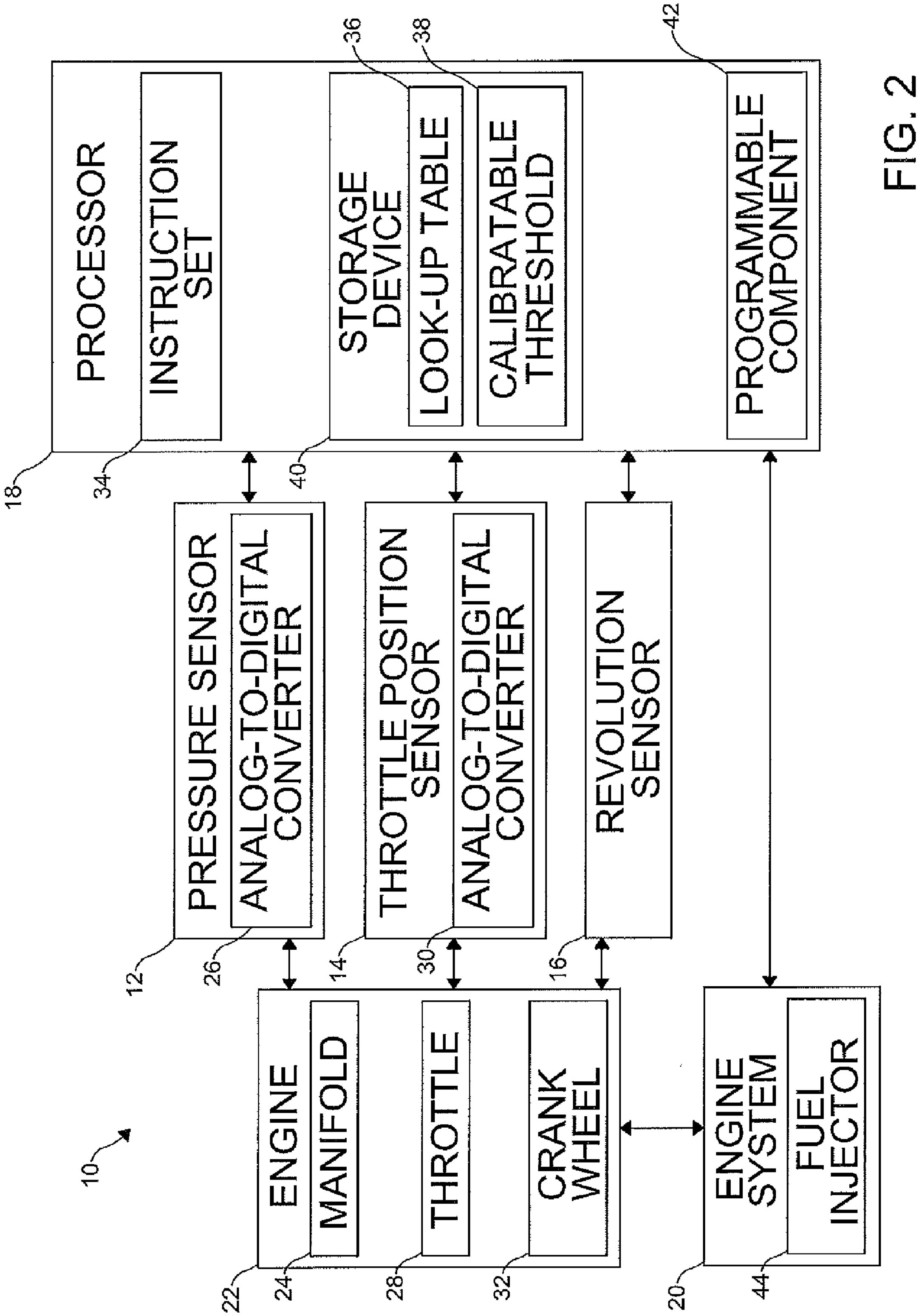
FIG. 2 is a schematic diagram of an engine control system according to an embodiment of the present invention.

FIG. 2 illustrates a control system 10 for an internal combustion engine according to an embodiment of the present invention. As shown, the system 10 includes a pressure sensor 12, a throttle position sensor 14, a revolution sensor 16, a processor 18, and an engine system 20. The control system 10 can include any number of components, as desired. The control system 10 can be integrated in any vehicle such as a motorcycle having a fuel injected engine 22, for example.

The pressure sensor 12 is typically a manifold absolute pressure (MAP) sensor positioned to measure a manifold absolute pressure (MAP) in a manifold of an internal combustion engine. As a non-limiting example, the pressure sensor 12 is disposed in an intake manifold 24 of the fuel injected engine 22. The pressure sensor 12 provides instantaneous manifold pressure information to the processor 18 in the form of a pressure sensor signal. However, it is understood that other pressure sensors can be used to measure absolute and differential pressure in a particular manifold of any type of engine. It is further understood that any number of the pressure sensors 12 can be used.

In certain embodiments, an analog-to-digital converter 26 (ADC) is in data communication with the pressure sensor 12 and the processor 18 to receive an analog signal (e.g. approximately 0-5 volts in range) from the pressure sensor 12, convert the analog signal into a digital signal, and transmit the digital signal to the processor 18 for conversion into a quantitative absolute pressure value (e.g. in units of kPa). As a non-limiting example, the conversion of digital signal by the processor 18 is based upon a pre-defined information stored in a look-up table.

The throttle position sensor (TPS) 14 can be any device adapted to monitor an opening (i.e. position) of a throttle 28. As a non-limiting example, the TPS 14 is disposed on a throttle plate shaft (not shown) to measure a proportion of an opening (i.e. position) of the throttle 28 from 0-100%. The TPS 14 provides a throttle position information to the processor 18 in the form of a position signal. As a non-limiting example the position signal is a voltage signal having a linear slope that is proportional to the opening (i.e. position) of the throttle 28. However, it is understood that other throttle position sensors can be used to generate any position signal representing an opening of the throttle 28.

In certain embodiments, an analog-to-digital converter 30 (ADC) is in data communication with the throttle position sensor 14 and the processor 18 to receive an analog signal from the position sensor 14, convert the analog signal into a digital signal, and transmit the digital signal to the processor 18 for conversion into a quantitative position value (e.g. in units of percent).

The revolution sensor 16 is typically a variable reluctance processor adapted to measure the rate of rotation of a rotating body. However, other revolution/rotation sensors can be used. In certain embodiments, the revolution sensor 16 is disposed to measure the revolutions per minute (rpm) of a thirty-six tooth minus one (36−1) crank wheel 32 of the engine 22. As a non-limiting example, the revolution sensor 16 outputs a waveform representing the rate of rotation of the crank wheel 32. As a further non-limiting example, the waveform is converted into a digital square wave and a time period of the square wave is converted into a quantitative rpm value of the crank wheel 32. It is understood that the revolution sensor 16 can be adapted to measure rotation of any apparatus or component of the engine 22.

The processor 18 may be any device or system adapted to receive an input signal (e.g. at least one of the signals received from the sensors 12, 14, 16), analyze the input signal, and configure the engine system 20 in response to the analysis of the input signal. In certain embodiments, the processor 18 is a micro-computer. As a non-limiting example, the processor 18 can be a part of a conventional engine control unit (ECU). In the embodiment shown, the processor 18 receives the input signal from at least one of the sensors 12, 14, 16 and a user-provided input.

As shown, the processor 18 analyzes the input signal based upon an instruction set 34. The instruction set 34, which may be embodied within any computer readable medium, includes processor executable instructions for configuring the processor 18 to perform a variety of tasks. The processor 18 may execute a variety functions such as controlling the operation of the sensors 12, 14, 16 and the engine system 20, for example. It is understood that various algorithms and software can be used to analyze the input signal.

As a non-limiting example, the instruction set 34 includes a suite of mathematical formulas to calculate an inferred manifold pressure based upon the position of the throttle 28 and the rate of rotation of the crank wheel 32. In certain embodiments, the inferred manifold pressure is determined from a look-up table 36 based upon the position of the throttle 28 and the rate of rotation of the crank wheel 32. As a further non-limiting example, the instruction set 34 includes mathematical formulas for comparing a ratio of the measured manifold pressure and the inferred manifold pressure to a calibratable threshold value 38.

In certain embodiments, the processor 18 includes a storage device 40. The storage device 40 may be a single storage device or may be multiple storage devices. Furthermore, the storage device 40 may be a solid state storage system, a magnetic storage system, an optical storage system or any other suitable storage system or device. It is understood that the storage device 40 may be adapted to store the instruction set 34. Other data and information may be stored and cataloged in the storage device 40 such as the data collected by the sensors 12, 14, 16 and the engine system 20, for example. In certain embodiments, the storage device 40 includes the look-up table 36 and the calibratable threshold 38. It is understood that the storage device 40 can include any number of look-up tables that can be referenced by the processor 18 to perform various calculations such as converting a received digital signal into a quantitative value (e.g. the measured manifold pressure, the throttle position, the rate of rotation, etc.).

The processor 18 may further include a programmable component 42. It is understood that the programmable component 42 may be in communication with any other component of the system 10 such as the sensors 12, 14, 16 and the engine system 20, for example. In certain embodiments, the programmable component 42 is adapted to manage and control processing functions of the processor 18. Specifically, the programmable component 42 is adapted to modify the instruction set 34 and control the analysis of the input signal and information received by the processor 18. It is understood that the programmable component 42 may be adapted to manage and control the sensors 12, 14, 16 and the engine system 20. It is further understood that the programmable component 42 may be adapted to store data and information on the storage device 40, and retrieve data and information from the storage device 40.

The engine system 20 can be any device or system adapted to interact with the engine 22 to affect an operation of the engine 22. As a non-limiting example, the engine system 20 can include a fuel injector 44 for injecting a fuel into the manifold 26 for a pre-determined time period (i.e. pulse width). The engine system 20 is in communication with the processor 18 to receive a control signal therefrom to control an operation of the engine system 20. As a further non-limiting example, an injection pulse width of the fuel injector 44 is responsive to the control signal received from the processor 18.

Figure 3:
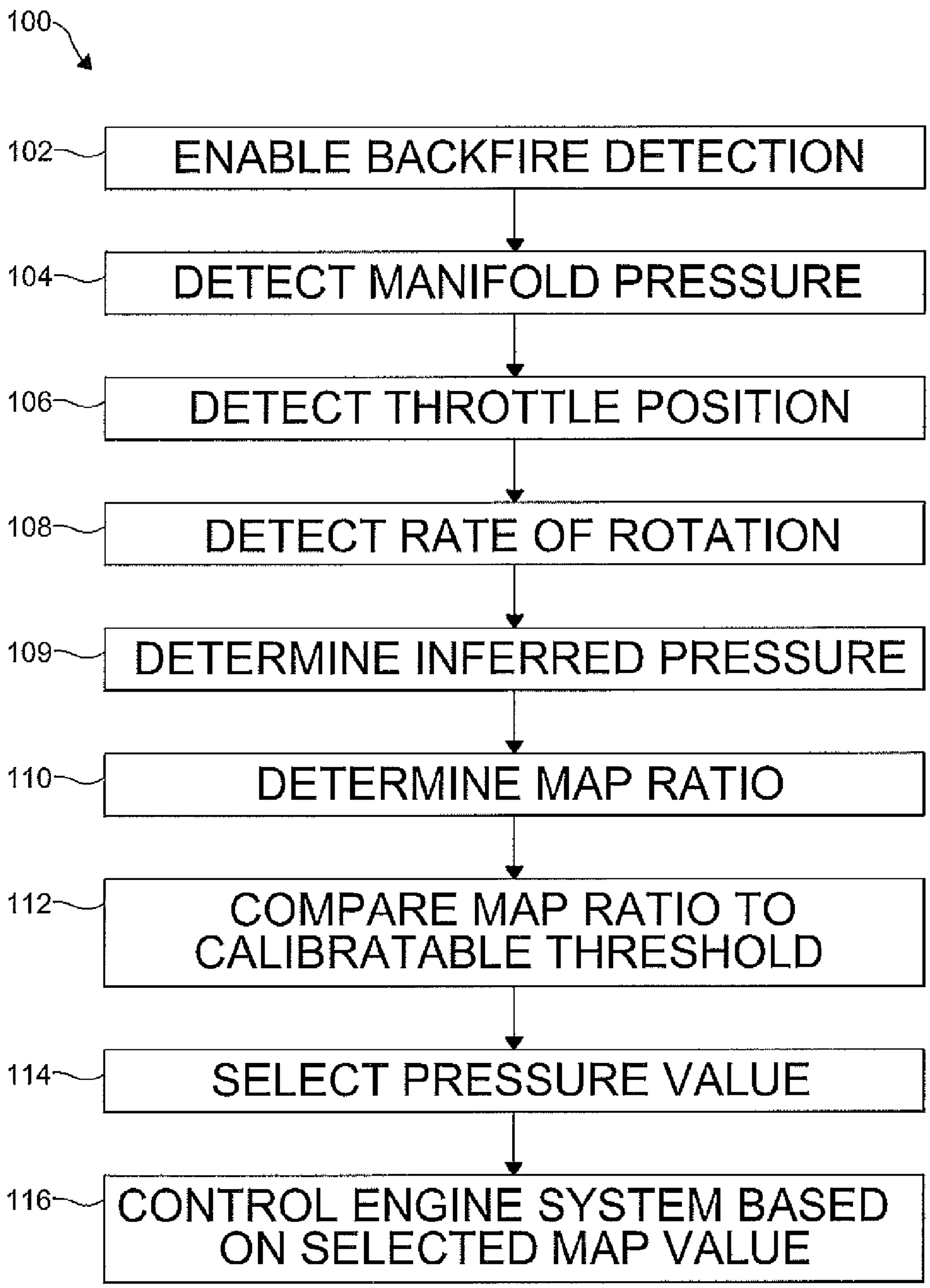
FIG. 3 is a schematic flow diagram of a method for induction backfire compensation for an engine according to an embodiment of the present invention.

FIG. 3 illustrates a method 100 for induction backfire compensation according to an embodiment of the present invention. In step 102, a backfire detection mode of the system 10 is enabled. In certain embodiments, a plurality of requirements (i.e. conditions) must be met to enable the backfire detection mode. As a non-limiting example, the requirements can include no faults detected by the sensors 12, 14, 16, a threshold value for a number of completed engine cycles, a calibratable threshold value for a rate of rotation (i.e. RPM). It is understood that any number of requirements can be pre-set prior to enabling the backfire detection mode. If the requirements are met, the system 10 enters a backfire detection mode and the method continues to step 104. If the requirements are not met, the engine 22 operates as normal with no backfire compensation until the requirements are met.

In step 104, the pressure sensor 12 detects a pressure in the manifold 24. In step 106, the throttle position sensor 14 detects an opening (i.e. position) of the throttle 28. In step 108, the revolution sensor 16 detects a rate of rotation of the crank wheel 32. In certain embodiments, each of the sensors 12, 14, 16 cooperate with the processor 18 to provide a quantitative value representing the measured pressure in the manifold 24, the position of the throttle 28, and the rate of rotation of the crank wheel 32, respectively.

In step 109, the processor 18 calculates an inferred pressure in the manifold 26 based upon the position of the throttle 30 and the rate of rotation of the crank wheel 32. As a non-limiting example, the inferred pressure is determined by comparing the values of the position of the throttle 30 and the rate of rotation of the crank wheel 32 to pre-defined values stored in the look-up table 36. However, any means of calculating the inferred pressure in the manifold 36 from the position of the throttle 30 and the rate of rotation of the crank wheel 32 can be used.

In step 110, the processor 18 analyzes the input signals received from each of the sensors 12, 14, 16 based upon the instruction set 34 to determine a MAP ratio (i.e. a ratio of the pressure measured by the pressure sensor 12 and the inferred pressure calculated by the processor 18). As a non-limiting example, the MAP ratio is a direct ratio of measured pressure and inferred pressure. However, other coefficients and factors can be used.

In step 112 the MAP ratio is compared to the calibratable threshold value 38 stored on the storage device 40. In step 114, one of the measured pressure and the inferred pressure is selected based upon a result of the comparison in step 112. For example, where the MAP ratio exceeds the calibratable threshold 38, an induction backfire event is assumed and the inferred pressure is selected. Where the MAP ratio is below the calibratable threshold 38, a normal operation is assumed and the actual measured pressure is selected.

In step 116, the engine system 20 is controlled based upon the selected one of the measured pressure and the inferred pressure. As a non-limiting example, an injection pulse width of the fuel injector 44 is controlled based upon the selected one of the measured pressure and inferred pressure. As a further non-limiting example, a fuel mass to air mass ratio in the manifold 24 is adjusted based upon the selected one of the measured pressure and inferred pressure. Accordingly, where the measured pressure is erroneously high due to an induction backfire event, the system 10 does not rely on the measured pressure to determine fuel control. Instead, the inferred pressure is used in order to minimize an over-fueling and a subsequent stall condition.

Figure 4:
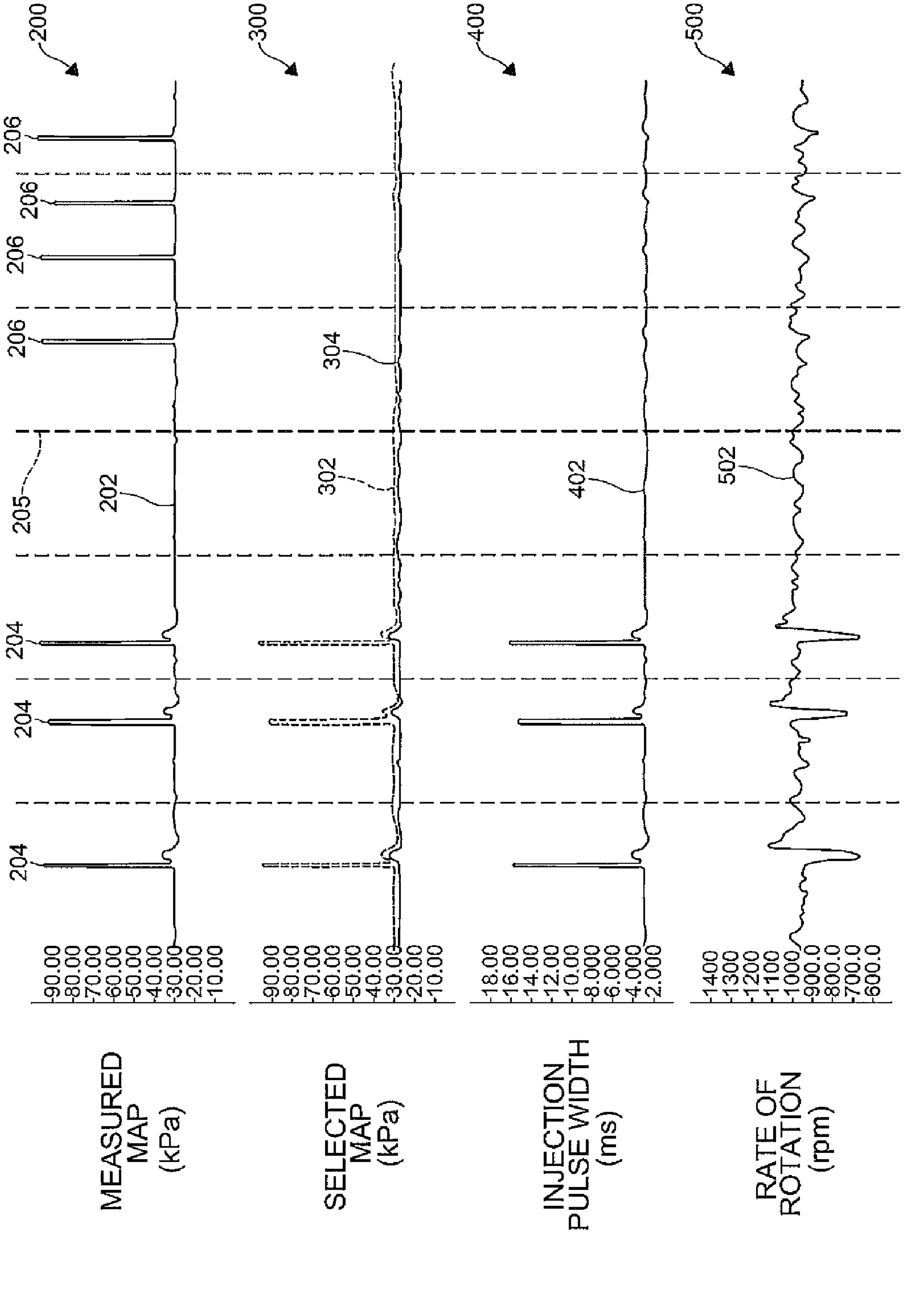
FIG. 4 is a graphical representation of a simulation of the method of FIG. 3 during an interval, showing a plot of a measured pressure, a plot of a selected pressure, a plot of an injection pulse width, and a plot of a rate of rotation during the interval.

FIG. 4 is a graphical representation of a simulation of the operation of the method 100. A simulated graph 200 of a measured manifold absolute pressure (MAP) 202 (in units of kilopascals (kPa)) is shown over a pre-determined time interval. As shown, three peaks of maximum absolute pressure 204 are detected prior to a time marker 205 and four peaks of maximum absolute pressure 206 are detected after the time marker 205. The time marker 205 is representative of the enabling of the backfire detection mode illustrated in step 102 of FIG. 3.

A simulated graph 300 shows a plot of selected manifold absolute pressure 302 (in units of kilopascals (kPa)) over the pre-determined time interval. Also shown, is a plot of an inferred manifold absolute pressure 304 calculated by the processor 18. Prior to the time marker 205, the backfire detection is not enabled and the selected manifold absolute pressure 302 is representative of the measured manifold absolute pressure 202. After the time marker 205, the backfire detection is enabled and the processor 18 selects one of the measured manifold absolute pressure 202 and the inferred manifold absolute pressure 304 based upon a comparison to the calibratable threshold 38. As shown in the graph 300, the inferred manifold absolute pressure 304 is selected as the appropriate pressure value after the time marker 205.

A simulated graph 400 shows a plot of injection pulse width 402 (in units of milliseconds (ms)) of the fuel injector 44 based upon the selected manifold absolute pressure 302. As shown, where the measured manifold absolute pressure 202 is selected, the injection pulse width 402 erroneously peaks in response to each of the maximum peaks 204 of the measured manifold absolute pressure 202, thereby maximizing a probability of a stall condition. After the time marker 205, the injection pulse width 402 is regulated based upon the selected manifold absolute pressure 302 and does not peak in response to the non-selected maximum peaks 206 of the measured manifold absolute pressure 202.

A simulated graph 500 shows a plot of a rate of rotation (in units of revolutions per minute (rpm)) of the crank wheel 32 over the time interval. As shown, where the measured manifold absolute pressure 202 is selected, the injection pulse width 402 erroneously peaks in response to a maximum peak of the measured manifold absolute pressure 202, causing an erroneous fuel mass to air mass ratio in the manifold 24, which causes a misfire and reduces the rate of rotation of the crank wheel 32, thereby maximizing a probability of a stall condition. After the time marker 205, the injection pulse width 402 is regulated based upon the selected manifold absolute pressure 302 and the rate of rotation of the crank wheel 32 is substantially stabilized, thereby minimizing a probability of a stall condition resulting from an induction backfire event.

It is understood that the graphs shown in FIG. 4 are simulated to illustrate the reaction of the control system 10 to an erroneously high pressure measurement with and without an induction backfire detection mode enabled. It is understood that the graphical representations 200, 300, 400, 500 do not show the full impact a true backfire event has on the engine 22 (e.g. internal exhaust gas recirculation (EGR) in the intake manifold 26).

The control system 10 and the method 100 provide a means to minimize a stall condition in the engine 22 due to an induction backfire event. Specifically, the control system 10 and the method 100 of the present invention detect an induction backfire event by comparing a measured pressure value to an inferred pressure value. If the ratio (measured/inferred) exceeds the calibratable threshold 38, then an induction backfire event is detected. The control system 10 and the method 100 compensate for an induction backfire event by relying on an inferred pressure value for a subsequent engine cycle (following the detect induction backfire event) instead of a actual measured pressure value.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A control system for an engine having at least one manifold, a throttle, and a crank wheel, the system comprising:

a pressure sensor to measure a pressure in the at least one manifold and generate a pressure signal representing the pressure measured;

a throttle position sensor to measure a position of the throttle of the engine and generate a throttle signal representing the position of the throttle measured;

a revolution sensor to measure a rate of rotation of the crank wheel of the engine and generate a rotation signal representing the rate of rotation measured;

a processor in communication with each of the pressure sensor, the throttle position sensor, and the revolution sensor to receive the pressure signal, the throttle signal, and the rotation signal, analyze the pressure signal, the throttle signal, and the rotation signal based upon an instruction set, and generate a control signal in response to analysis of the pressure signal, the throttle signal, and the rotation signal, wherein the instruction set includes a means to determine an inferred pressure based upon the position of the throttle measured and the rate of rotation of the crank wheel measured; and an engine system in communication with the processor to receive the control signal therefrom, the engine system responsive to the control signal to control a function of the engine system.

2. The system according to claim 1, wherein the pressure sensor is an absolute pressure sensor.

3. The system according to claim 1, further comprising an analog-to-digital converter to convert at least one of the pressure signal, the throttle signal, and the rotation signal to a digital signal.

4. The system according to claim 1, wherein the instruction set includes means for comparing a ratio of the measured pressure and the inferred pressure to a calibratable threshold value.

5. The system according to claim 1, wherein the engine system controls a fuel injection into the at least one manifold in response to the control signal.

6. The system according to claim 1, wherein the engine system controls a fuel mass to air mass ratio that is injected into at least one manifold in response to the control signal.

7. The system according to claim 1, wherein the engine system includes a fuel injector and controls an injection pulse rate of the fuel injector in response to the control signal.

8. A method for induction backfire compensation, the method comprising the steps of:

a) providing an engine having at least one manifold, a throttle, and a crank wheel;

b) measuring a pressure in the at least one manifold;

c) measuring a position of the throttle;

d) measuring a rate of rotation of the crank wheel;

e) determining an inferred pressure value based upon the position of the throttle measured and the rate of rotation of the crank wheel measured;

f) comparing a ratio of the pressure measured and the inferred pressure value to a calibratable threshold;

g) selecting one of the pressure measured and the inferred pressure value based upon whether the ratio of the pressure measured and the inferred pressure exceeds the calibratable threshold; and h) controlling an engine system in response to the one of the pressure measured and the inferred pressure selected.

9. The method according to claim 8, wherein the pressure measured is an absolute pressure.

10. The method according to claim 8, wherein the inferred pressure value is determined by comparing the position of the throttle measured and the rate of rotation of the crank wheel measured to a pre-defined look-up table.

11. The method according to claim 8, wherein the pressure measured is selected where the ratio of the pressure measured and the inferred pressure exceeds the calibratable threshold.

12. The method according to claim 8, wherein the inferred pressure is selected where the ratio of the pressure measured and the inferred pressure is below the calibratable threshold.

13. The method according to claim 8, wherein the engine system includes a fuel injector and controls an injection pulse rate of the fuel injector in response to step h).

14. The system according to claim 8, wherein the engine system controls a fuel mass to air mass ratio that is injected into the at least one manifold in response to step h).

15. A method for induction backfire compensation, the method comprising the steps of:

a) providing an engine having at least one manifold, a throttle, a crank wheel, and a fuel injection device;

b) measuring an absolute pressure in the at least one manifold;

c) measuring a position of the throttle;

d) measuring a rate of rotation of the crank wheel;

e) calculating an inferred pressure based upon the position of the throttle measured and the rate of rotation of the crank wheel measured;

f) comparing a ratio of the pressure measured and the inferred pressure to a calibratable threshold;

g) selecting one of the pressure measured and the inferred pressure based upon whether the ratio of the pressure measured and the inferred pressure exceeds the calibratable threshold; and h) controlling the fuel injection device in response to the one of the pressure measured and the inferred pressure selected.

16. The method according to claim 15, wherein the inferred pressure is determined by comparing the position of the throttle measured and the rate of rotation of the crank wheel measured to a pre-defined look-up table.

17. The method according to claim 15, wherein the pressure measured is selected where the ratio of pressure measured and the inferred pressure exceeds the calibratable threshold.

18. The method according to claim 15, wherein the inferred pressure is selected where the ratio of pressure measured and the inferred pressure is below the calibratable threshold.

19. The system according to claim 15, wherein an injection pulse rate of the fuel injection device is controlled in response to step h).

* * * * *